United States Patent [19]
Narita et al.

[11] Patent Number: 5,555,114
[45] Date of Patent: Sep. 10, 1996

[54] LIQUID CRYSTAL DISPLAY WITH REFLECTIVE COLOR FILTERS

[75] Inventors: Kenichi Narita; Takeshi Suzaki, both of Tottori, Japan

[73] Assignees: Sanyo Electric Co., Ltd., Moriguchi; Tottori Sanyo Electric Co., Ltd., Tottori, both of Japan

[21] Appl. No.: 480,731

[22] Filed: Jun. 7, 1995

Related U.S. Application Data

[63] Continuation of Ser. No. 156,900, Nov. 24, 1993, abandoned.

[30] Foreign Application Priority Data

Nov. 30, 1992 [JP] Japan .................... 4-320720

[51] Int. Cl.$^6$ ................................ G02F 1/1335
[52] U.S. Cl. ................................ 359/65; 359/64
[58] Field of Search ................ 359/64, 65, 68

[56] References Cited

U.S. PATENT DOCUMENTS

| | | | |
|---|---|---|---|
| 4,032,218 | 6/1977 | Scheffer | 350/160 LC |
| 5,325,218 | 6/1994 | Willett et al. | 359/53 |

FOREIGN PATENT DOCUMENTS

| | | |
|---|---|---|
| 2262844 | 9/1975 | France . |
| 2274059 | 1/1976 | France . |
| 5983112 | 5/1959 | Japan . |
| 3188420 | 8/1991 | Japan ................ 359/65 |
| 84-02198 | 6/1984 | WIPO ................ 359/65 |

OTHER PUBLICATIONS

Scheffer, "Twisted nematic display with cholesteric reflector", *J. Phys. D: Appl. Phys.*, vol. 8, 1975, pp. 1441–1448.

*Primary Examiner*—William L. Sikes
*Assistant Examiner*—Charles Miller
*Attorney, Agent, or Firm*—Armstrong, Westerman, Hattori, McLeland & Naughton

[57] ABSTRACT

A color liquid crystal display includes a cholesteric liquid crystal layer for selectively reflecting at high efficiency circularly polarized light having a specific wavelength, for example, a wavelength corresponding to red, blue or green, a birefringent layer formed on the liquid crystal layer, and a polarize plate formed on the birefringent layer. The birefringent layer includes a pair of electrodes and a nematic liquid crystal layer formed between the electrodes. Circularly polarized light of a specific wavelength that is selectively reflected by the cholesteric liquid crystal layer has its vibration direction rotated by retardation of the birefringent layer 20 when an electric field is not applied to the liquid crystal. When an electric field is applied to the liquid crystal layer, the reflected circularly polarized light is directly transmitted through the birefringent layer. The polarize plate blocks or transmits light according to the vibration direction of the light transmitted through the birefringent layer. This liquid crystal display has high usage efficiency of light and displays color clearly.

8 Claims, 15 Drawing Sheets

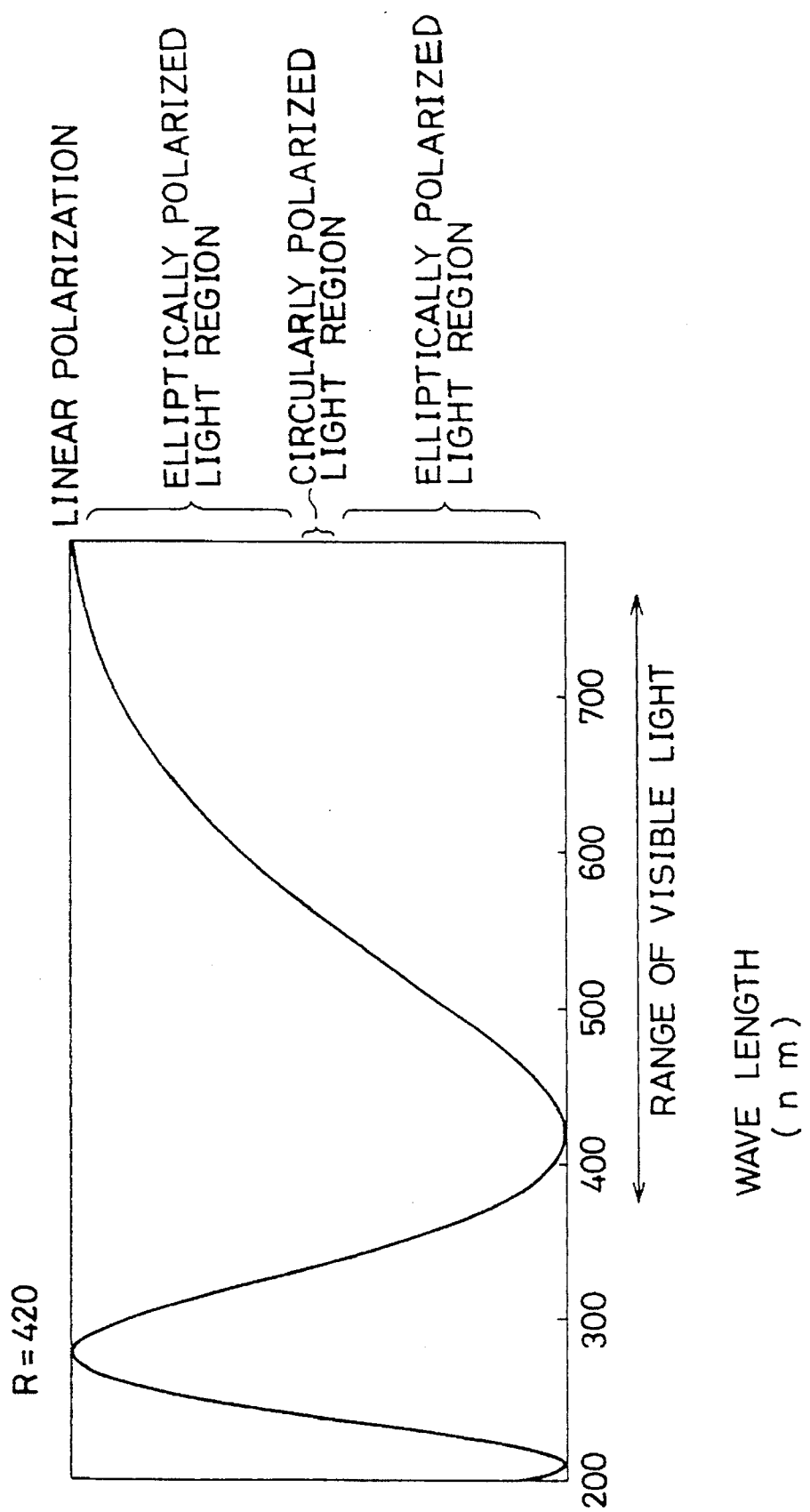

LIQUID CRYSTAL DISPLAY WITH REFLECTIVE COLOR FILTERS

This application is a continuation of application Ser. No. 08/156,900 filed Nov. 24, 1993, now abandoned.

BACKGROUND OF THE INVENTION

1. Field of the Invention

The present invention relates to liquid crystal displays, and more particularly, to a color liquid crystal display utilizing selective reflection of cholesteric liquid crystal.

2. Description of the Background Art

A conventional field effect mode liquid crystal display has a merit that a thin display with low power consumption can be formed. A typical display sandwiches a chiralnematic liquid crystal layer with orthogonal polarizers, as described in Japanese Patent Publication No. 51-13666. FIG. 1 shows the device disclosed in this publication, and includes a polarize plate 101, an analyze plate 105, and an electro-optic cell 106 therebetween. Electro-optic cell 106 includes a pair of electrodes 102 and 104, and a nematic liquid crystal layer 103 therebetween. This device transmits or blocks light incident upon polarize plate 101 according to the intensity of the electric field applied between electrodes 102 and 104. This device has a narrow angle of view, and it is difficult to achieve contrast available for practical usage without a transmission type display. These disadvantages result mainly from loss of light by the polarize plate and angle of view dependency upon the axis of polarization. In general, there is loss of light exceeding 50% even if the twist angle of a nematic layer is increased to improve characteristics such as response and angle of view dependency in a display employing birefringence. If color is to be displayed with such a device, light loss is further aggravated due to a filter which will be used. Also, a transmission type display requires illuminating means at the rear thereof, causing increase in the thickness of size and power consumption of the display. This will degrade the merits of a liquid crystal display.

A liquid crystal display in which dye is added to a chiralnematic liquid crystal, i.e. the so-called guest-host type or white tailor type liquid crystal display, is known. Such a display requires dye that is bright in color and that has affinity for liquid crystal molecules because electro-optical characteristics inherent in liquid crystal is limited by the dye. However, a combination of dye and liquid crystal with superior electrical characteristics has not yet come into practical use. A short pitch cholesteric liquid crystal display taking advantage of coloring according to the temperature dependency of the liquid crystal is proposed, but lacks stable color display and high response rate of display.

Another system is known that uses light scattering by focal conic texture or Williams domain texture. This system also allows reflective type display. However, this system takes advantage of electro-optical effect depending upon natural chirality of liquid crystal, so that the ability to return to the former state after electric field removal depends upon the rearranging ability of the liquid crystal itself. Therefore, this system has low response speed. An improved optical material used in this system is disclosed in Japanese Patent National Publication No. 61-502128 and Japanese Patent Laying-Open No. 62-2231. These publications describe the technique to confine liquid crystal within a three dimensional network structure of porous polymeric resin to form a capsule. However, usage of such an encapsuled material results in low contrast since the change of the amount of light transmission controlled by liquid crystal is limited by the resin component. There was also a disadvantage that a bright color display where a non-lighted area exhibits achromatic color and a lighted area exhibits high saturated color could not be achieved because the color of a color filter will always be slightly observed due to the transmitted light and resin.

As described above, conventional liquid crystal displays had low usage efficiency of light and many problems in material or the like to be solved.

SUMMARY OF THE INVENTION

An object of the present invention is to provide a color liquid crystal display for practical usage with higher usage efficiency of light.

Another object of the present invention is to provide a color liquid crystal display with high contrast.

A further object of the present invention is to provide a color liquid crystal display with high response rate.

The present invention is conceived based on the presence of a cholesteric liquid crystal which efficiently reflects light of a specific wavelength. The present invention is applicable to monocolor display, multicolor display, and full color display.

According to an aspect of the present invention, a color liquid crystal display includes a color selection layer for selectively reflecting circularly polarized light of a specific wavelength, and an optical layer formed on the color selection layer and having a liquid crystal layer and means for applying an electric field to the liquid crystal layer. The optical layer carries out color display with light selectively reflected by the color selection layer according to the value of voltage applied to the liquid crystal layer. The color selection layer can consist essentially of cholesteric liquid crystal.

According to another aspect of the present invention, a color liquid crystal display includes a plurality of color selection layers selectively reflecting respectively a plurality of circularly polarized light respectively having specific wavelengths, an optical layer formed on the color selection layers at the side where the light of the specific wavelengths is reflected, having a liquid crystal layer and means for applying an electric field to the liquid crystal layer, and a layer for absorbing light transmitted through the color selection layers, which is formed on the color selection layers at the side opposite to the optical layer. The optical layer carries out color display with light selectively reflected by the color selection layers according to a value of the electric field applied to the liquid crystal layer. The color selection layers can consist essentially of cholesteric liquid crystal.

According to a further aspect of the present invention, a color liquid crystal display includes a plurality of color selection layers selectively reflecting a plurality of circularly polarized light respectively having specific wavelengths, an optical layer formed on the color selection layers at the side where the light of the specific wavelengths is reflected, having a liquid crystal layer and matrix electrodes sandwiching the liquid crystal layer, a layer for absorbing light passing through the color selection layer, which is formed on the color selection layers at the side opposite to the optical layer, and means for applying driving voltage to the matrix electrodes. Each of the plurality of color selection layers defines a pixel corresponding to the matrix of electrodes.

The optical layer responds to the driving voltage to carry out color display with light selectively reflected by the respective plurality of color selection layers. The color selection layers can consist essentially of cholesteric liquid crystal.

In the display of the present invention, circularly polarized light such as of red, blue or green is reflected with almost no absorption by the color selection layer consisting essentially of cholesteric liquid crystal. Light reflected by the color selection layer at an efficiency approximating 100% is provided from the optical layer according to the value of the electric field. The color selection layer is independent of ambient conditions such as the electric field, and immediately reflects light of a specific color. Only reflected light needs to be controlled electro-optically for color display in the optical layer. Such a structure realizes higher usage efficiency of light and faster response. The optical layer only has to electrooptically control light of a specific wavelength to be reflected and light not to be reflected by the color selection layer. Thereby, the display can obtain a high contrast with a specific wavelength color and black.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 12 is a chart showing the characteristics of a birefringent member providing circularly polarized light in the proximity of 560 nm under an OFF state.

FIG. 13 shows the state where the tilt angle of a liquid crystal molecule is changed when the voltage applied to the liquid crystal layer is changed for each wavelength.

DESCRIPTION OF THE PREFERRED EMBODIMENTS

Figure 1:
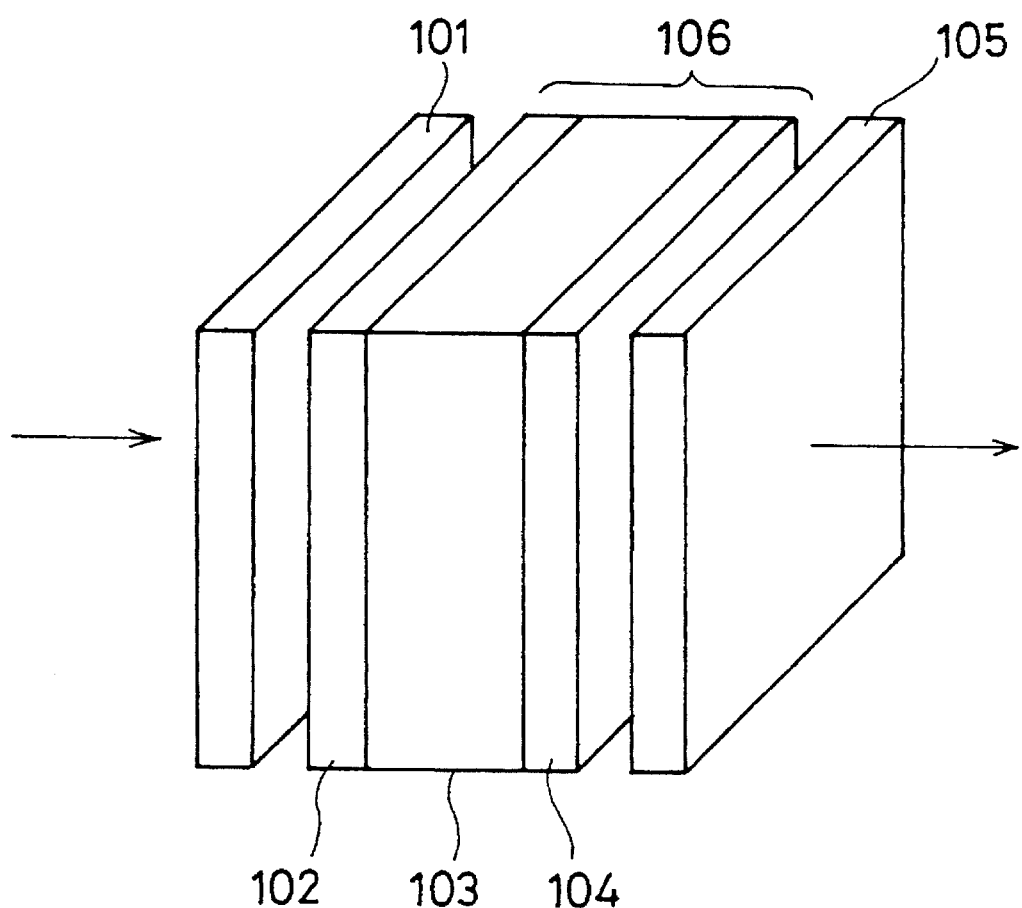
FIG. 1 schematically shows a conventional field effect mode liquid crystal display.

According to a preferred embodiment of the present invention, a color selection layer takes advantage of selective reflection of a liquid crystal having a cholesteric phase. A selective reflection wavelength $\lambda_0$ in a cholesteric liquid crystal layer is generally obtained by the following equation:

$$\lambda_0 = n \cdot p$$

where n is the average index of refraction in a liquid crystal layer, and p is the helical pitch. In order to selectively reflect light of a specific wavelength in the present invention, a cholesteric liquid crystal with n and p substantially fixed is used under usage conditions. The values of n and p are determined according to a wavelength to be selected. The value of n can be determined according to the type of the liquid crystal compound. The value of p can be varied within a certain range in a predetermined liquid crystal compound. When a plurality of wavelengths are to be selected, a plurality of types of compounds each having a specific pitch are prepared, or compounds having different pitches in a specific compound are prepared. For color display, $\lambda_0$ must be within a visible light range. Therefore, n and p are determined such that $\lambda_0$ is within a visible light range of approximately 380–780 nm. In the present invention, the typical pitch of cholesteric liquid crystal is within the wavelength range of visible light.

According to the present invention, a cholesteric liquid crystal consisting essentially of cyclic organopolysiloxane represented by the following formula can be used:

In the formula, R represents a Si-C bonded methyl group, M represents the same or different groups of the following formula, and n is 4 to 7.

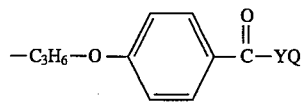

In the formula, Y represents O, and Q represents a cholesteryl group or a group of

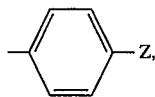

where Z represents

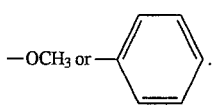

This compound and a manufacturing method thereof is disclosed in Japanese Patent Laying-Open No. 57-165480.

A polymer liquid crystal of the following formula disclosed in Japanese Patent Laying-Open No. 61-137133 can be used in the present invention.

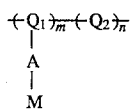

In the formula, $-(Q_1)_m-(Q_2)_n$ is the main chain of the polymer; A is a spacer; and M is a mesogen. The $Q_1$-A-M unit, and the $Q_2$ unit may be coupled in blocks or randomly. The main chain is polysiloxane, polyacrylate, polymethacrylate, or poly ($\alpha$-chloroacrylate). A polymer liquid crystal with polysiloxane as the main chain is obtained by adding side chains of a spacer having a terminal vinyl group and a mesogen to polysiloxane prepolymer under the presence of a platinum catalyst. Polysiloxane prepolymer preferably includes a compound represented by the following formula:

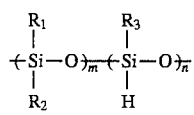

In the formula, $R_1$, $R_2$, $R_3$ are an alkyl group or a aryl group, and m is an integer not greater than 2000. The alkyl group of $R_1$, $R_2$ or $R_3$ s an alkyl group with 1–18 carbons, preferably a methyl group or an ethyl group. An aryl group is preferably a phenyl group. A mesogen preferably includes the groups set forth in the following in order, i.e. a phenyl benzoate derivative, a biphenyl benzoate derivative, a phenyl napthoate derivative, a 1, 4-trans-phenyl cyclohexane dicarboxylate derivative, and cyanobiphenyl.

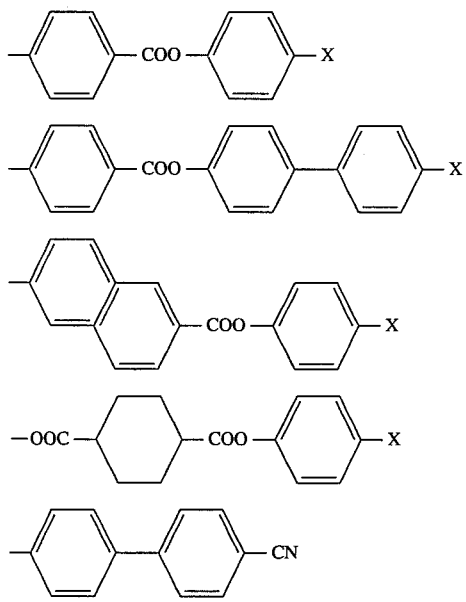

(In the formula, X is a cyano group, halogen, or an alkoxy group.)

An ethylene group or ether group is used for the spacer. The length of the methylene group is $C_5$–$C_{20}$, preferably $C_8$–$C_{14}$.

A compound in which a group for coupling with another ring, for example an acryl group, and a cholesteric group are coupled alternately to a siloxane ring can be used for the cholesteric liquid crystal layer. In this case, an OH group can be added to the acryl group to improve the adherence between the cholesteric liquid crystal layer and the substrate.

Figure 2:
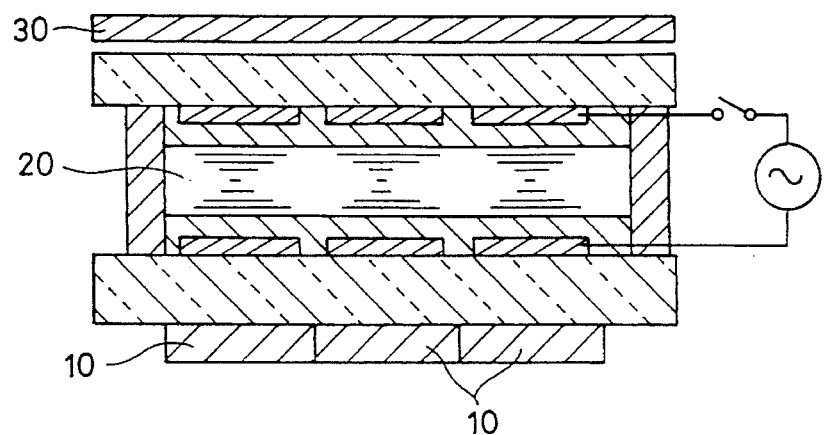
FIG. 2 is a diagram for describing the mechanism of a display according to the present invention.

The mechanism of the present invention will be described with reference to FIG. 2. Referring to FIG. 2, color selection layers 10 are formed of cholesteric liquid crystal layers for reflecting circularly polarized light having different specific wavelengths, i.e. the wavelengths of red, blue, and green which are the three primary colors. A birefringent layer 20 having a predetermined retardation is formed on color selection layers 10. Birefringent layer 20 includes a super twist nematic liquid crystal layer. Light output from birefringent layer 20 is selectively transmitted by a light selection layer 30 formed of a polarize plate.

According to the above-described simple structure, light transmitted through birefringent layer 20 becomes circularly polarized due to retardation of birefringent layer 20. Light of a predetermined rotation direction having a predetermined wavelength is reflected by color selection layer 10 and observed from selection layer 30. If the retardation of birefringent layer 20 does not generate a circularly polarized light of a predetermined wavelength selected by color selection layer 10, a predetermined color is not observed. Therefore, by setting the axis of polarization of selection layer 30 to a predetermined direction to allow observation of reflected light from color selection layer 10 in either the presence or absence of an applied electric field in birefringent layer 20, positive or negative coloring display can be achieved.

Figure 3:
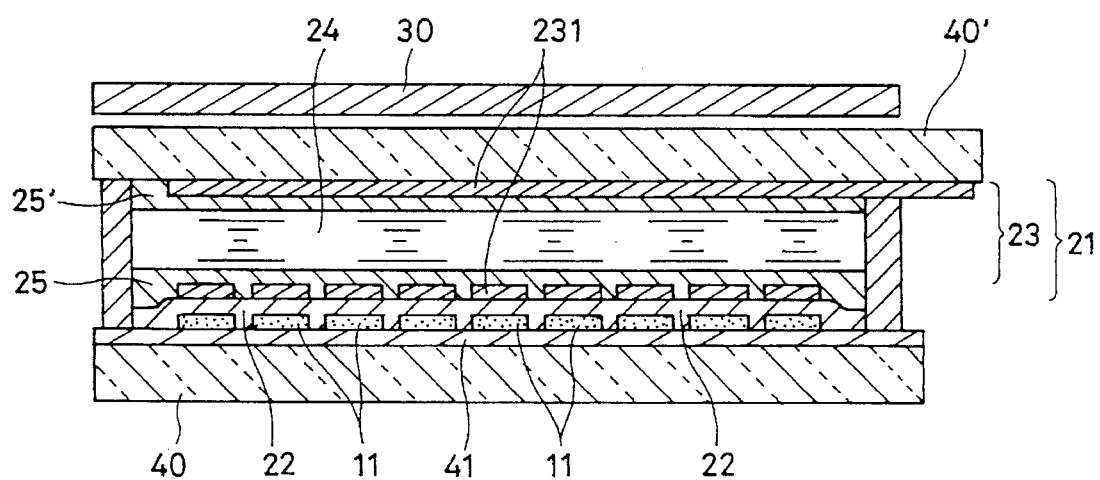
FIG. 3 is a sectional view of a display according to an embodiment of the present invention.

In accordance with the above-described mechanism, the device shown in FIG. 3 is provided. Referring to FIG. 3, a substrate 40 includes a coloring layer 41 of black color. Coloring layer 41 absorbs light to display a bright color and to increase the contrast. In the present invention, a coloring layer for absorbing light is provided if necessary. The coloring layer can be formed from, for example, a Cr thin film.

A color selection layer 11 consisting essentially of a cholesteric liquid crystal that reflects light of a specific wavelength is formed on coloring layer 41. Layer 11 reflects light circularly polarized in a predetermined direction having a specific wavelength, and transmits light circularly polarized in an opposite direction and light of the other wavelength. Electric field applying means for controlling the display is not provided in the cholesteric liquid crystal layer per se. Color selection layer 11 is formed as a stripe pattern where three types of cholesteric liquid crystal layers are repeated corresponding to the three primary colors. A polymer liquid crystal having a cholesteric phase as disclosed in Japanese Patent Laying-Open Nos. 57-165480 and 61-137133, for example, can be used for the cholesteric liquid crystal used in color selection layer 11. Also, a compound may be used in which a group for coupling with another ring, for example an acryl group, and a cholesteric group are alternately coupled to a siloxane ring at its periphery. In this case, OH can be added to the acryl group to improve the adherence between color selection layer 11 and substrate 40. In carrying out initial orientation of the cholesteric group with an electric field or a magnetic field, the dielectric anisotropy of the cholesteric group coupled to the siloxane ring may be specified, for example specified to negative, and the polymer liquid crystal can be sealed while applying an electric field to the direction of the thickness of the cholesteric liquid crystal layer. The helical direction of cholesteric can be made to match the optical axis by virtue of this process. By fixing the cholesteric helical direction along the optical axis of the device, the color selection layer 5 always reflects light of a specific wavelength regardless of the presence of an electric field. The cholesteric liquid crystal layer has wavelength selectivity according to the pitch of cholesterics. Because extraordinary refractive index $N_e$ (T) is proportional to the temperature dependence of a liquid crystal order parameter S (T), the temperature dependency of liquid crystal can be reduced by setting appropriately the extraordinary refractive indices $n_0$ (T), $n_e$ (T) and temperature dependent helical pitch P (T). Also, cholesteric liquid crystals of different pitches can be blended so as to select a predetermined color due to the presence of additive property. Furthermore, by stacking layers respectively reflecting right-handed and left-handed light for cholesteric liquid crystals carrying out color selection for wavelengths of red, blue and green, almost all circularly polarized light can be reflected. Thus, the usage efficiency of light is improved significantly to allow a clear and bright display.

Birefringent layer 21 formed on color selection layer 11 and having a predetermined retardation preferably includes a phase shifting film (also referred to as retardation film) 22 consisting essentially of poly(vinyl alcohol) and having a predetermined retardation substantially all over the range of visible light, and a liquid crystal cell layer 23 having electric field application means of transparent electrodes 231 arranged in a matrix. By means of phase shifting film 22 and liquid crystal cell layer 23, birefringent layer 21 exhibits retardation so as to convert circularly polarized light into linearly polarized light when an electric field is not applied, and transmits circularly polarized light directly when an electric field is applied. Phase shifting film 22 may be formed by expanding a film on the substrate, or by attaching a film adjusted to have a predetermined retardation. Liquid crystal cell layer 23 includes the so-called twist nematic (TN) liquid crystal layer or a super twist nematic (STN) liquid crystal layer having a great helical twist angle of a liquid crystal molecule. These liquid crystal layers may be combined with an active matrix device or substrate such as TFT, MIM or the like. Liquid crystal layer 24 of liquid crystal cell layer 23 is sandwiched by orientation films 25 and 25'.

A light selection layer 30 of a polarize plate is formed on liquid crystal cell layer 23 with a transparent substrate 40' therebetween. Light selection layer 30 selectively passes through light according to the polarized state of reflective light. A linear or circular polarize plate, for example, may be used for this layer.

A cholesteric liquid crystal of a short pitch reflects light of a predetermined one rotation direction and transmits light of the other rotation direction with respect to light of a wavelength selected by the helical pitch. The cholesteric liquid crystal does not affect light of other wavelengths. When the cholesteric liquid crystal of color selection layer 11 selects left-handed circularly polarized light of red, right-handed circularly polarized light of red is passed through, and only left-handed circularly polarized light of red is reflected by the liquid crystal layer. The transmitted right-handed circularly polarized light and light of other wavelengths are absorbed by coloring layer 41. The reflected circularly polarized light reaches the polarize plate via the phase shifting film and the liquid crystal layer. If color selection layer 11 is a stacked layer where light of both the right and left rotation is reflected, the majority of light of red color is reflected to arrive at the polarize plate. Birefringent layer 21 has its retardation adjusted. The phase of light passing through the birefringent layer can be advanced by π according to the absence/presence of an electric field. The retardation can also be eliminated. According to the above-described structure, selection layer 30 displays an achromatic color (black) and a red color according to the absence and presence of an electric field, respectively. It is to be noted that an electric field is not applied to the liquid crystal that carries out wavelength selection in the present invention. The property of electrical response is dependent upon the liquid crystal cells formed on the color selection layer. The liquid crystal cell takes advantage of techniques of high level superior in light efficiency, response, or the like. Thus, the display of the present invention allows high time-divisional driving display of bright color contrast.

Figure 4:
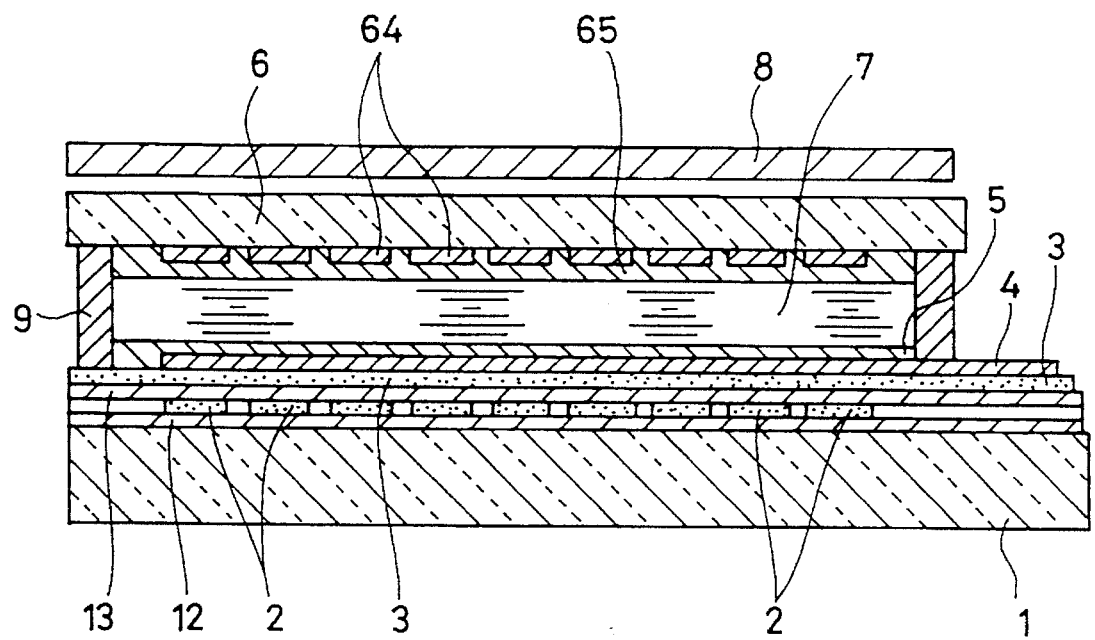
FIG. 4 is a sectional view of a display according to another embodiment of the present invention.

Referring to FIG. 4, a display according to another embodiment of the present invention is shown. Various layers set forth in the following are provided on a substrate 1 of flat glass. Reflective liquid crystal layer 2 consists essentially of a cured cholesteric liquid crystal that reflects circularly polarized light of a selected wavelength. Layer 2 is sandwiched by an underlying layer 12 and a protection layer 13 if necessary. A phase shifting layer 3 is formed on layer 2. Phase shifting layer 3 consists essentially of nematic liquid crystal obtained by curing polymer liquid crystal to serve substantially as a ¼ wave plate. An electrode film 4 is formed on phase shifting layer 3. Electrode film 4 includes a plurality of striped transparent electrodes (ITO) provided in parallel to form a matrix with electrodes 64 on another substrate 6. An orientation film 5 is formed on film 4 for liquid crystal molecules. An electrode film 64 and an orientation film 65 are formed on substrate 6 of glass or the like. A liquid crystal layer 7 orientated by orientation films 5 and 65 is inserted between substrates 1 and 6. The arrangement of the liquid crystal molecules are controlled by the electric field, whereby the optical characteristics change. A field effect mode liquid crystal such as a nematic liquid crystal (TN) having a twist orientation of 90°, for example, or a super nematic liquid crystal (STN) having a great twist orientation such as 270° are used for liquid crystal layer 7. A polarize plate 8 is disposed at the outer side of substrate 6. Substrate 6 may have the linear polarization ability if necessary. In this case, the substrate becomes the polarizer.

Figure 5A:
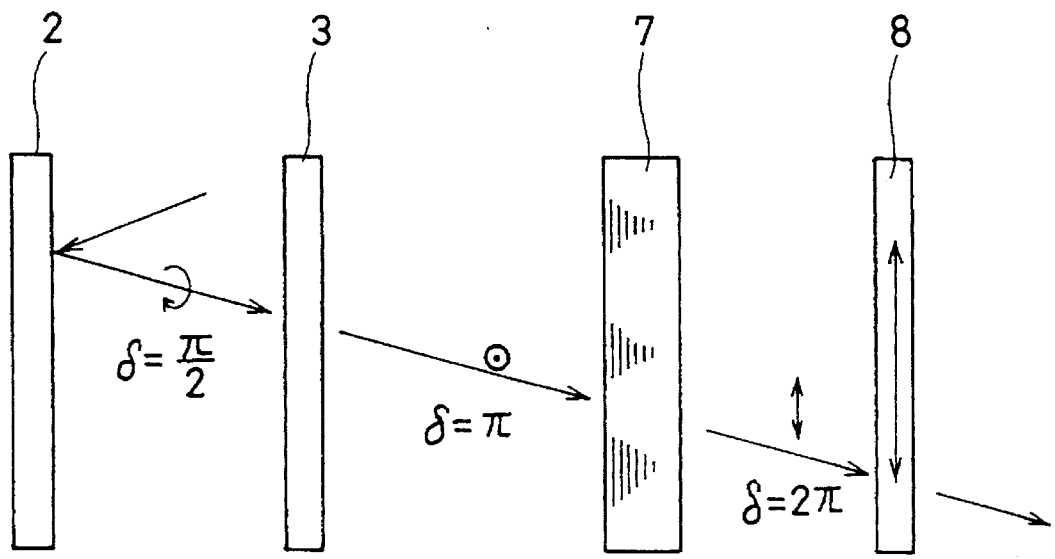
FIGS. 5A and 5B are diagrams for describing the mechanism of the display of FIG. 4.
Figure 5B:
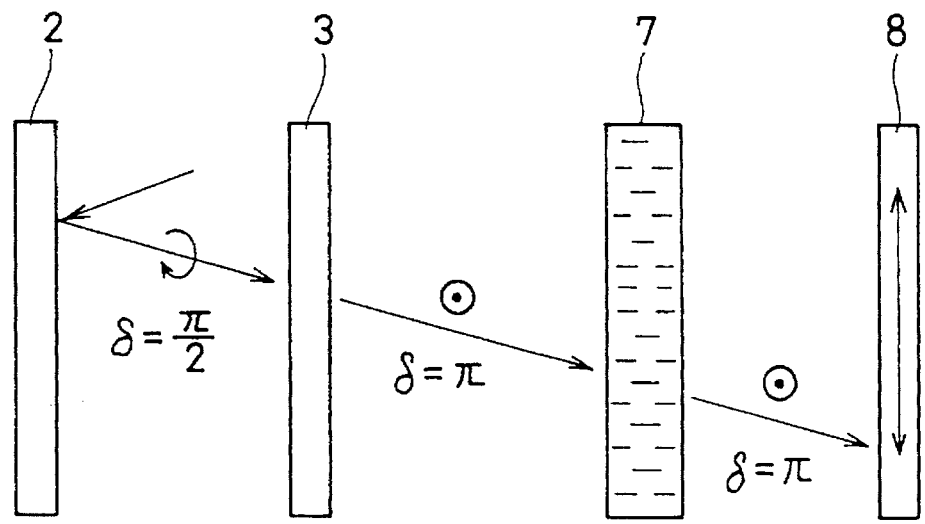

In principle, for example, reflective liquid crystal layer 2 is regarded as means for generating circularly polarized light of right (or left) rotation having a specific wavelength; phase shifting layer 3 is regarded as a ¼ wave plate; liquid crystal layer 7 is regarded as a ½ wave plate; and the polarizer is regarded as a member for selecting the vibration direction of light. Referring to FIG. 5A, light polarized by reflective liquid crystal layer 2, for example, light advanced by π/2 to the right, is converted into a linearly polarized light advanced by π by phase shifting layer 3. Then, the linearly polarized light is advanced by 2π by liquid crystal layer 7 having no electric field applied. If this light coincides with the axis of polarization of polarizer 8, light of the specific color selected by the reflective liquid crystal layer will be observed. Referring to FIG. 5B where an electric field is applied to liquid crystal layer 7, the liquid crystal molecules previously having a helical configuration are oriented substantially perpendicular to the plane of the substrate. Therefore, the liquid crystal layer does not serve as a ½ wave plate. The light output from phase shifting layer 3 advanced by π is directly transmitted through liquid crystal layer 7. Light with no change in phase is orthogonal to the axis of polarizer 8, so that light will not be passed through polarizer 8, resulting in the observation of a black color. Thus, color display can be achieved by arranging a plurality of reflective liquid crystal layers so that the selected wavelengths are changed periodically with the wavelengths corresponding to red, green, and blue. Although each optical means (phase shifting layer 3, liquid crystal layer 7) affects the advance speed of light, practically no light is absorbed. Polarizer 8 does not function to select light partially, but transmits all the light having coinciding vibration direction. Therefore, a bright and high contrast display can be carried out. If a phase shifting layer 3 is not used, the retardation of liquid crystal layer 7 should be appropriately adjusted to transmit/block light by polarizer 8. Also, a polarizer that has selectivity with respect to circularly polarized light may be used. In FIGS. 5A and 5B, liquid crystal layer 7 is regarded as a ½ wave plate, for example. However, the layer 7 is not limited to the ½ wave plate and can be a ¼ wave plate (with the phase shifting layer as a ½ wave plate) or a 1 wave plate (a ¼ wave plate when an electric field is applied).

A display of the above-described structure can be produced as set forth in the following. A light absorbing film is provided, if necessary, on a substrate 1 of flat glass or the like. Prior to the formation of a reflective liquid crystal layer on substrate 1, an orientation process is applied, such as rubbing the surface of the flat glass. However, it is preferable to provide an underlaying layer 12 of polyimide resin or the like to a thickness of 10–200 nm and rub the surface thereof by a cotton cloth. Then, cholesteric polymer crystal is dissolved in a solvent such as toluene and m-xylene, or not dissolved in the solvent and heated to 80°–120° C., to be applied on underlying layer 12. Cholesteric liquid crystal can be obtained by using the polymer liquid crystal material disclosed in, for example, Japanese Patent Laying-Open Nos. 57-165480 and 61-137133. Also, a compound that has a siloxane ring coupled alternately with a group for coupling with another ring, an acryl group for example, and a cholesteric group, may be used. In this case, cholesteric liquid crystals are applied upon the aforementioned orientation-processed film because the helical direction of cholesterics must match the optical axis of the device even if an electric field is not applied. Next, a drying process may directly be carried out. However, a protection film is preferably applied before the drying process for the purpose of stabilizing the orientation. Then, crosslinking is carried out by a curing process. Preferably, the polymer liquid crystal layer is cured after an orientation process is applied to the provided protection film. The protection film is preferably formed from polyvinyl alcohol or the like to a thickness of, for example 100–1000 nm. Following the application of a protection film, a heat treatment at 80°–120° C. is applied, or a rubbing process is carried out. Then, the polymer liquid crystal layer is cured by exposure to ultraviolet light. The pitch of the cholesteric liquid crystal layer is fixed by this curing process. Therefore, the liquid crystal layer is formed that reflects light of a wavelength selected by a certain pitch of the liquid crystal. The thickness of layer 2 is 3–300 μm.

Then, a phase shifting layer, an electrode film and an orientation film are stacked on layer 2. Phase shifting layer 3 can similarly be formed from a nematic polymer liquid crystal having a main chain of polysiloxane and side chains of a nematic liquid crystal, and an active group that can be crosslinked appropriately by ultraviolet light. This polymer liquid crystal is diluted by a solvent to be applied on layer 2 or on protection layer 13, and then cured by ultraviolet light. Because phase shifting layer 3 exhibits the nature of polymer resin, the thickness thereof can preferably be about 1 μm, if the Δn as a nematic liquid crystal is 0.15. An ITO film is used for electrode film 4. For orientation film 5, an orientation material for TN, STN, or ferroelectric liquid crystal is used. This holds also for orientation film 65 and electrode film 64 on the other substrate 6. Substrates 1 and 6 having the above-described layers are overlapped, and then sealed with a sealing material 9 at its periphery to form a cell. Next, liquid crystal is introduced between substrates 1 and 6 by a dropping method, or a vacuum implantation method. The inlet is then sealed. Ferroelectric liquid crystal, TN or STN can be used for liquid crystal layer 7.

In the above-described process, a protection film 13 may be used aiming for an orientation film. In this case, the solvent for a protection film is preferably one that has low compatibility with polymer liquid crystals. For example, NMP is preferable for siloxane type polymer liquid crystals. When a polyimide type is used as a protection film aiming at orientation, one that has imidization reaction completed is preferred. Such a film can be grown by a vacuum method. The rubbing process following the formation of the protection film is preferably carried out parallel to the rubbing direction of underlying layer 12. Then, substrate 1 is heated to 60°–150° C. to reduce viscosity of the polymer liquid crystal to establish orientation. A cooling process is then carried out.

The method of establishing orientation in the protection film is not limited to rubbing. For example, using polymer such as PVA dissolved in a solvent that does not dissolve polymer liquid crystal at all or with extremely low solubility, a protection film of 1–100 μm in thickness is formed by spin coating, roll coating or the like. Then, substrate 1 is heated to 30°–90° C., followed by exerting a shear force on the protection film. The shear force is exerted at an intensity according to the heated state of substrate 1 using a rubbing puff such as a rayon cloth. A smaller force is preferred in proportion to a higher temperature. Following the application of a shear force, a cooling process is applied to form the orientation.

An optical polarization memorizing film can be used to orientate the cholesteric liquid crystal layer in stability. In this case, an optical polarization memorizing film of 5–200 nm in thickness is formed as a protection layer after application of a cholesteric liquid crystal layer. Such a film can be formed by adding a substance that transforms into a cis state from a trans state by light excitation of a specific wavelength, for example Methyl Orange, by approximately 0.1–10% into a polymer such as PVA, PI or PVF and dissolving the same into a solvent, followed by a spin coating and baking process. When this film is irradiated with polarized light of a specific wavelength, it provides orientation order to the liquid crystal in a direction at a predetermined angle with respect to the direction of the axis of polarization. For example, when such a film is formed from PVA having Methyl Orange added, light of 514.5 nm as the main wavelength is directed so as to be 90° to the rubbing direction. The inclined angle of polarized light with respect to the rubbing direction used as reference light is selected according to a desired orientation direction and the polarization storage characteristic of the material. The irradiation energy is dependent upon the thickness of the memory film, additives, and the amount added. When Methyl Orange is added by 1% with a film thickness of 300 nm, an irradiation energy not less than 20 J/cm$^2$ is preferred. Substrate 1 is heated to 60°–150° C. during or immediately after light irradiation to reduce the viscosity of polymer liquid crystal to obtain uniform orientation. Then, the same is restored to normal temperature to obtain the reflective liquid crystal layer.

The thickness of reflective liquid crystal layer 2 is preferably maintained at a constant level. Therefore, a spacer material can be introduced in forming layer 2. This is particularly desirable when a protection film 13 is used. When an orientational and protection film of, for example, polyimide type is used, spacers of a predetermined dimension are sprayed after polymer liquid crystal is applied. Then, substrate 1 is heated to 60°–150° C. to reduce the viscosity of the liquid crystal, whereby the affinity of the spacers for the liquid crystal is increased and the spacers are immersed in the liquid crystal layer. Then, a protection layer is formed, and a pressure of approximately 0.05–3.0 kg/cm$^2$ is exerted on the protection film via the substrate. Then, it is heated to 60°–150° C. to form the orientation, followed by a cooling process.

In the above-described process, each layer has its characteristic adjusted so as to improve the quality of the device. The above-described process can be carried out readily to provide a liquid crystal display of high light usage efficiency and performance.

Figure 6A:
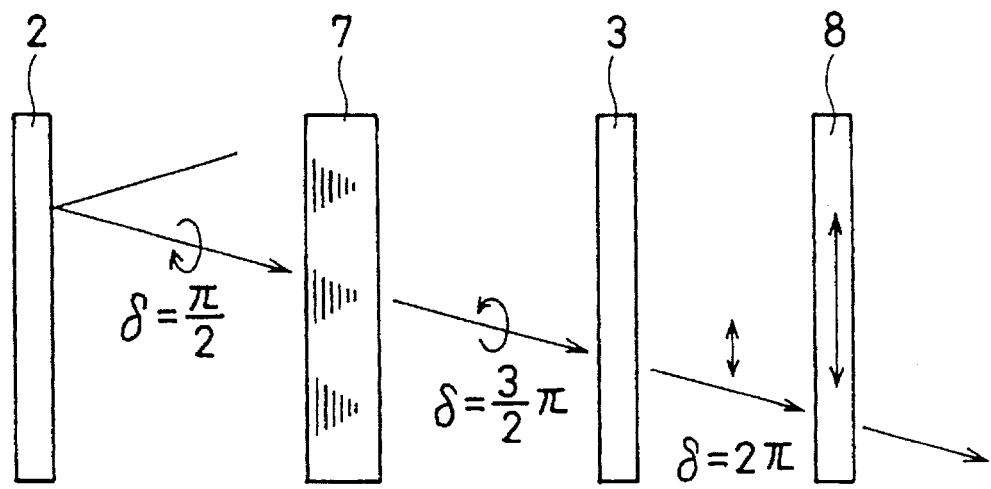
FIGS. 6A and 6B are diagrams showing the mechanism of a display according to the present invention when required layers take an arrangement different from those shown in FIGS. 5A and 5B.
Figure 6B:
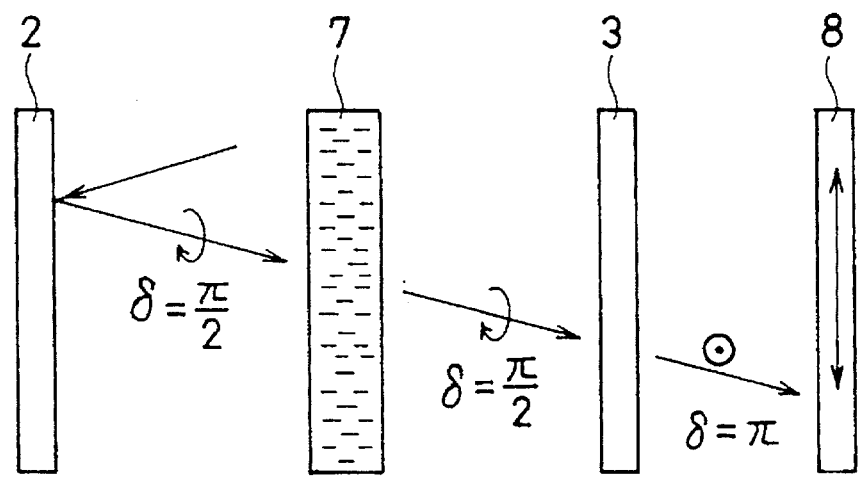
Figure 7:
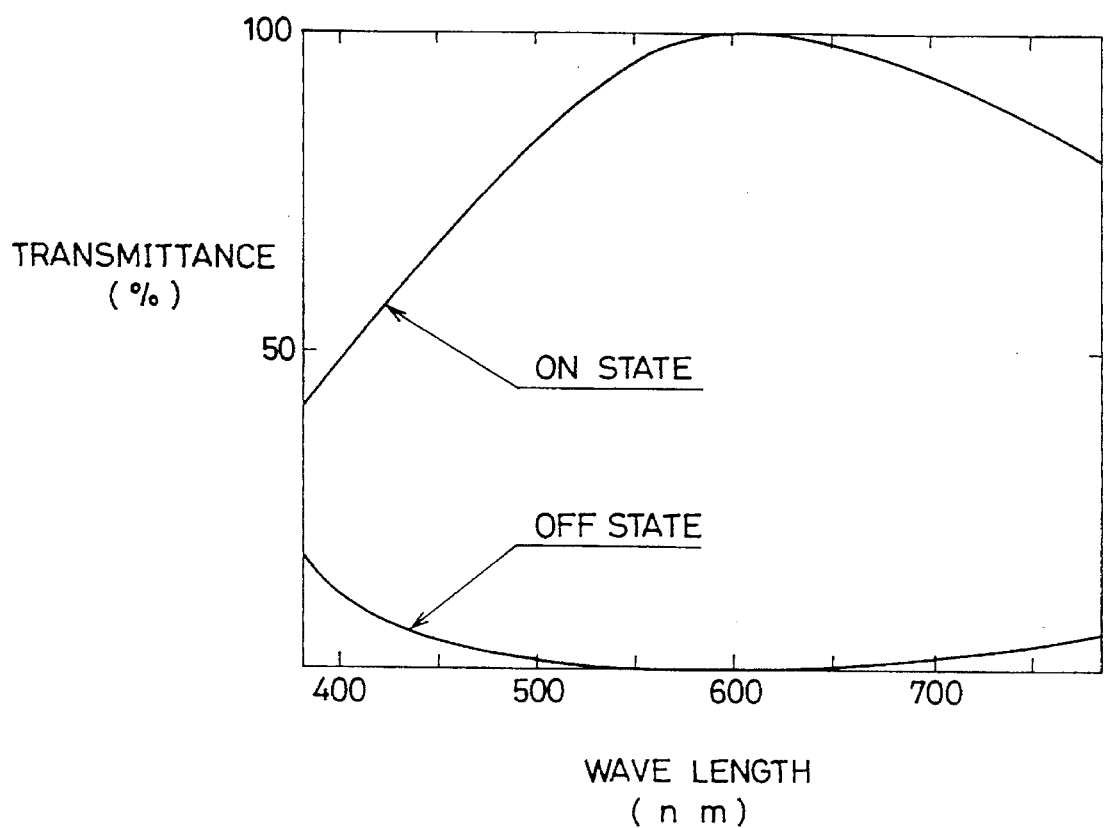
FIG. 7 is a chart showing the characteristics of a display when ferroelectric liquid crystal is used in the liquid crystal layer according to the structure of FIGS. 6A and 6B.
Figure 8:
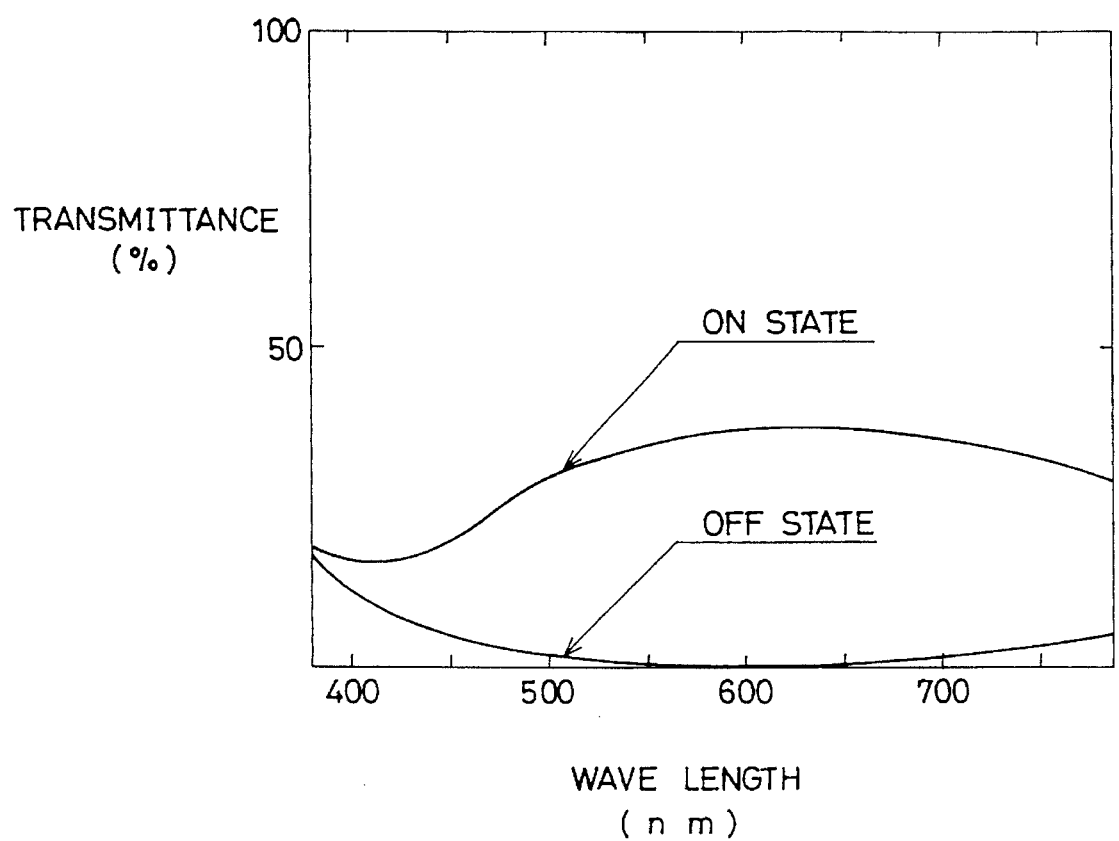
FIG. 8 is a chart showing the characteristics of a display when super twist nematic liquid crystal (STN) is used in the liquid crystal layer according to the structure of FIGS. 6A and 6B.
Figure 9:
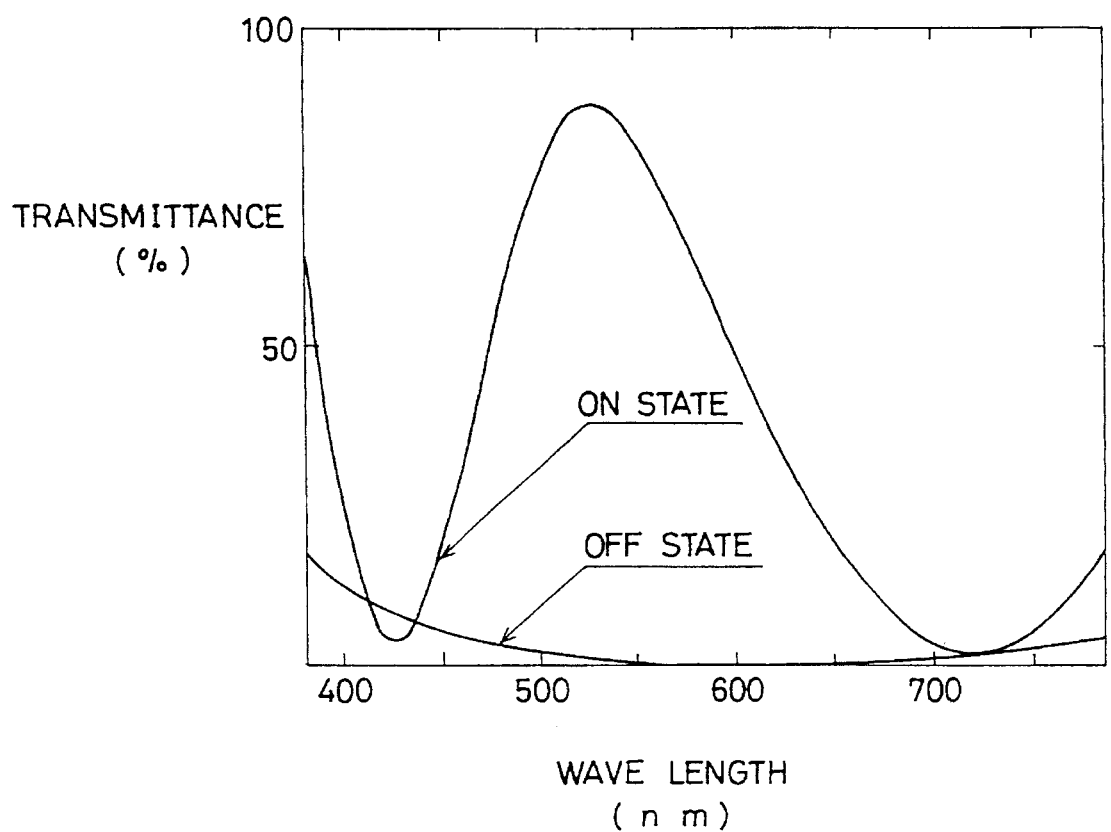
FIG. 9 is a chart showing the characteristics of a display when another STN is used in the liquid crystal layer according to the structure shown in FIGS. 6A and 6B.
Figure 10:
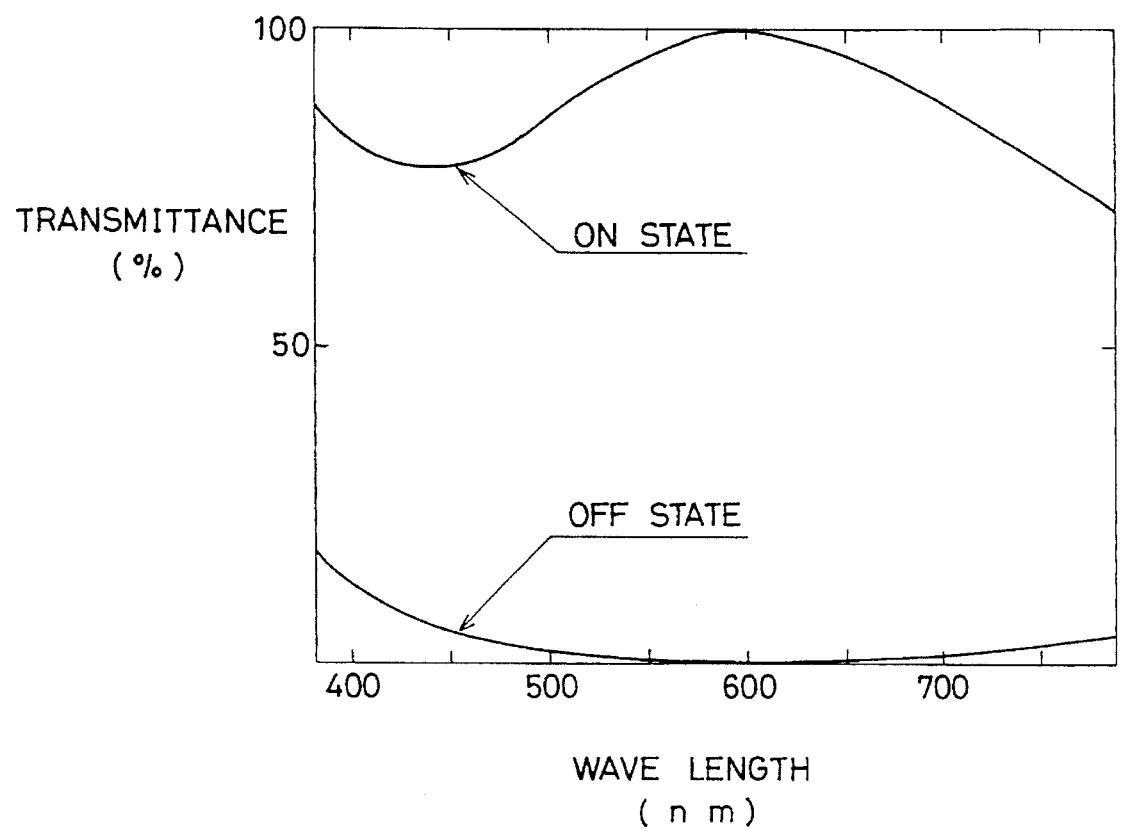
FIG. 10 is a chart showing the characteristics of a display when STN is used in the liquid crystal layer according to the structure shown in FIGS. 5A and 5B.

According to the above-described structure, liquid crystal layer 7 acts as a ½ wave plate or an isotropic layer. For multicolor display, liquid crystal layer 7 must cover substantially the entire range of visible light. For example, when a ferroelectric liquid crystal of uniaxial orientation independent of the presence of an electric field is used for layer 7, reflective layer 2 and phase shifting layer 3 may be provided on separate substrates 1 and 6 respectively. In this case, the location of each layer is as shown in FIGS. 6A and 6B where the characteristics of the liquid crystal display covers substantially the entire range of visible light as shown in FIG. 7. FIG. 7 and FIGS. 8–10 described afterwards are illustrated with continuous curves to indicate the transmittance of all the wavelengths in the visible light range. In practice, however, only the wavelength ranges corresponding to the three primary colors are used in the display. When TN or STN superior in stability than ferroelectric liquid crystal is used, conditions differ from those of a ferroelectric liquid crystal particularly in the absence of an electric field. When a liquid crystal molecule takes a helical configuration as in TN and STN, a display of high contrast that covers the entire range of visible light cannot be obtained with the optical arrangement shown in FIGS. 6A and 6B. In a STN mode where a wide viewing angle and high response are obtained, the circularly polarized light reflected at layer 2 does not become a completely reversed circularly polarized light due to the helical structure of the liquid crystal molecules in liquid crystal layer 7, and becomes an elliptically polarized light through the layer 7. Therefore, light loss increases as shown in FIG. 8, because polarizer 8 partially transmits the light component having coinciding optical axis out of the light passing through liquid crystal layer 7. If liquid crystal layer 7 corresponds to a specific wavelength, a display is obtained that has a peak of narrow width at a specific wavelength as shown in FIG. 9. This is not adequate for multicolor display. Therefore, when a nematic liquid crystal is used, the fact that the influence of the helical structure of a liquid crystal molecule is less in linear polarized light than in circular polarized light is taken into consideration. In this case, a reflective layer, a phase shifting layer of polymer resin, an electrode layer, and an orientation layer are preferably formed in order on a substrate. The phase shifting layer is preferably formed between the reflective layer and the liquid crystal layer. The formed stacked structure has low light loss. Furthermore, it is rather immune to other optical and physical influence. This display can achieve high contrast over the entire wavelength range of visible light.

In the present invention, the color selection layer has high reflectance with respect to the circularly polarized light. In order to improve the usage efficiency of light, the reflective light should be output at high efficiency from the optical layer formed on the color selection layer. Therefore, polarization control is preferably carried out for each specific wavelength reflected by the color selection layer in multicolor or full color display. In other words, brighter colors can be displayed by changing the characteristics of the optical layer for each selected wavelength. In this case, the optical layers must be stacked accurately in accordance with the alignment of a multiple of color selection layers. Considering that the pixel pitch of a graphic display using a dot matrix is approximately 100 μm, formation of the optical layers will become very complicated and tedious. In order to simplify the structure thereof, an approach was considered in which the optical layer has the same structure even when the selected wavelength of the color selection layer changes. For example, when wavelengths of red, green and blue are selected, the present invention can provide the optical layer which gives a complete circularly polarized light of a predetermined wavelength and elliptically polarized light in the wavelength range including the three wavelengths. When a layer having birefringence is to be used for the optical layer, the intensity of light transmitting a stacked body sandwiching a birefringent layer with orthogonal polarizers is represented by the following equation.

$$I = I_0 \sin^2(2\theta) \sin^2\{(\pi/\lambda) \Delta n d\}$$

Figure 11:
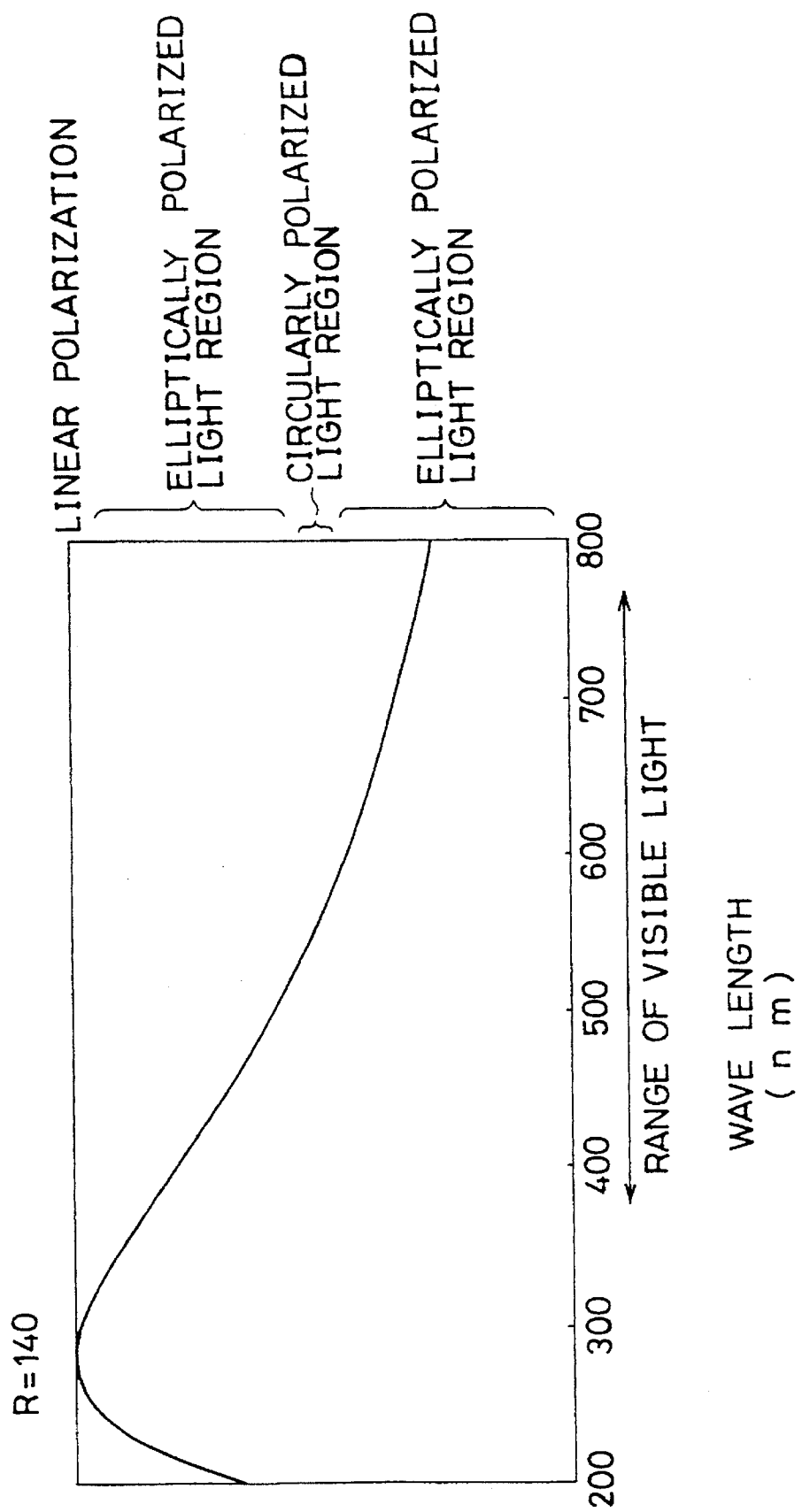
FIG. 11 is a chart showing the characteristics of a birefringent member providing circularly polarized light in the proximity of 560 nm in an ON state.

I: intensity of transmitted light $I_0$: intensity of incident light

θ: angle formed between the optical axis of the birefringent layer and one of the polarization axes λ: wavelength of light used for the observation Δn: birefringent anisotropy of the birefringent layer d: thickness of the birefringent layer It is apparent from the above equation that the intensity of light passing through the stacked body depends upon the wavelength. Therefore, circularly polarized light is obtained only for a predetermined wavelength, and not for other wavelength in the same stacked body. FIG. 11 shows the characteristics of a birefringent member that provides circularly polarized light in the vicinity of 560 nm under an ON state 1, i.e. a state where a select voltage is applied in a simple matrix mode drive or a state where a certain voltage is applied in a static mode drive. In this birefringent member, the retardation Δn·d is 140 nm, and circularly polarized light of first order is generated. FIG. 12 shows the characteristics of a birefringent member providing circularly polarized light in the vicinity of 560 nm under an OFF state, i.e. a state where a non-select voltage is applied in the simple matrix mode drive or a state where no voltage is applied in the static mode drive. The retardation thereof is 420 nm. There, circularly polarized light of second order is generated in the visible light range. With a higher order of circularly polarized light, the characteristics will not show a curve that increases or decreases monotonically in the visible light range, and the birefringent member will not have a predetermined circularly polarized light component with respect to a wavelength selected by the color selection layer. Therefore, if the optical layer generates circularly polarized light of low order in the visible light range under the ON or OFF state of the liquid crystal layer, color display is achieved with a single optical layer. The circularly polarized light of low order can include that of the first to fourth order, preferably the first to third order, most preferably the first and second order. The optical layer providing circularly polarized light of low order can be formed from a single layer consisting essentially of chiralnematic liquid crystal including 60–80% by weight of difluorophenylestercyclohexane, cyanofluorophenylester, cyclohexanecyclohexene, cyclohexanecarbonatephenylester, or the like with a Δn of 0.07–0.115. The optical layer may also be a stacked body of the above-described single layer and a single phase shifting film consisting essentially of polycarbonate, poly(vinyl alcohol), polyester, polypropylene, cellulose acetate, poly(vinyl butyral), or the like. The obtained layer has the characteristics shown in FIGS. 11 and 12, and allows bright color display.

When green light of 545 nm, for example, is circularly polarized under left rotation by the optical layer in the above-described display, elliptically polarized light is generated at the red wavelength of 610 nm or blue wavelength of 450 nm. In order to obtain polarized light which is nearer to circular polarized light also at these wavelength ranges, the optical layer is formed so that the liquid crystal layer has a predetermined retardation substantially over the entire range of visible light to allow a brighter display of color. For this purpose, the voltage level can be varied for each color to change the retardation of each selected wavelength. Taking, as an example, an optical layer that generates circular polarization of the first order, the optical layer that provides circularly polarized light in the vicinity of 590 nm has a greater retardation in the vicinity of 450 nm. The retardation decreases as the angle of a liquid crystal molecule with respect to the surface of the substrate (tilt angle) increases. A greater tilt angle can be obtained by increasing the applied voltage. Therefore, as shown in FIG. 13, the tilt angle is left 3° in the portion on the red color selection layer, and an applied voltage is set so that the tilt angle is increased at the portion on the blue color selection layer. Thus, light of blue will not be greatly out of circularly polarized light. As a result, circular polarization component of high intensity can be used for display in any of the three primary colors.

Figure 15:
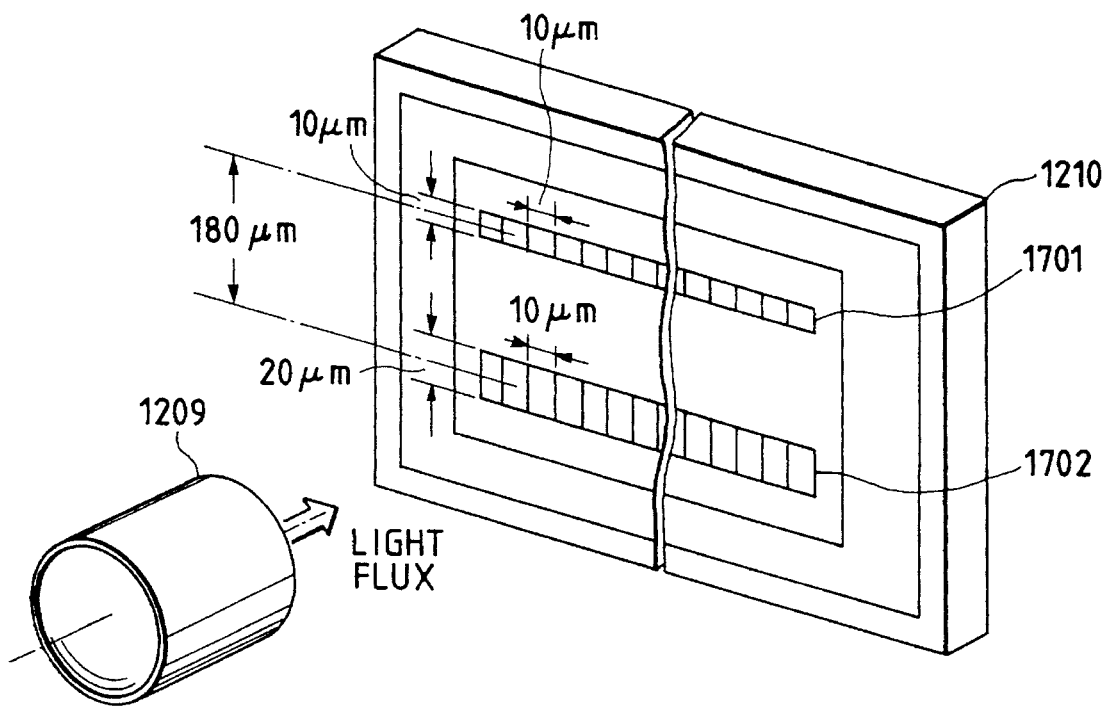
FIG. 15 schematically shows an example of matrix electrodes used in the present invention.
Figure 14:
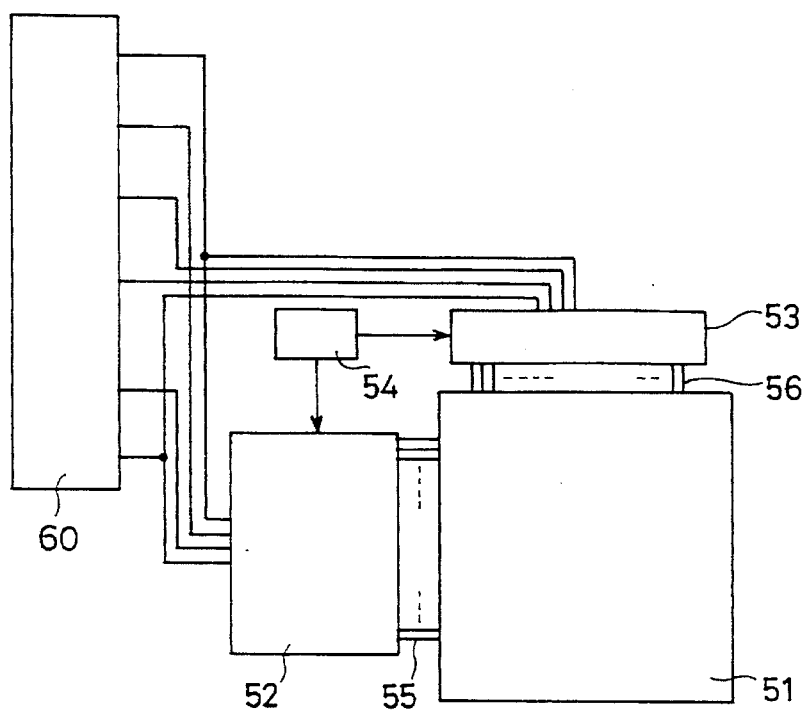
FIG. 14 shows a scanning circuit and a driver circuit connected to the electrodes of the display of the present invention.
Figure 15:
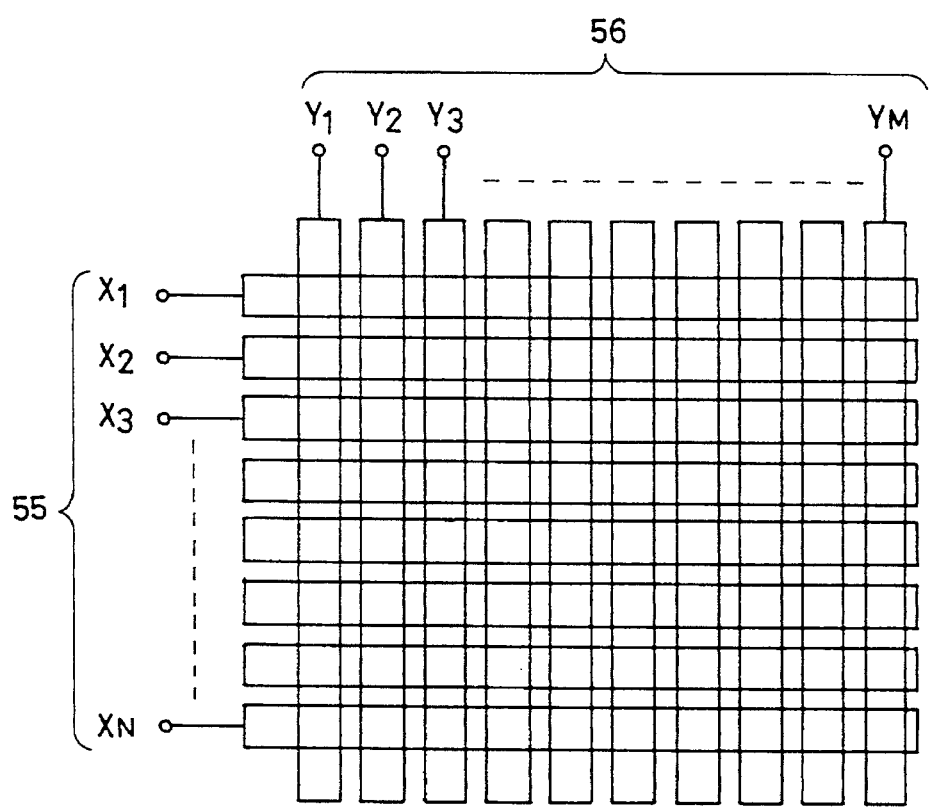
Figure 16:
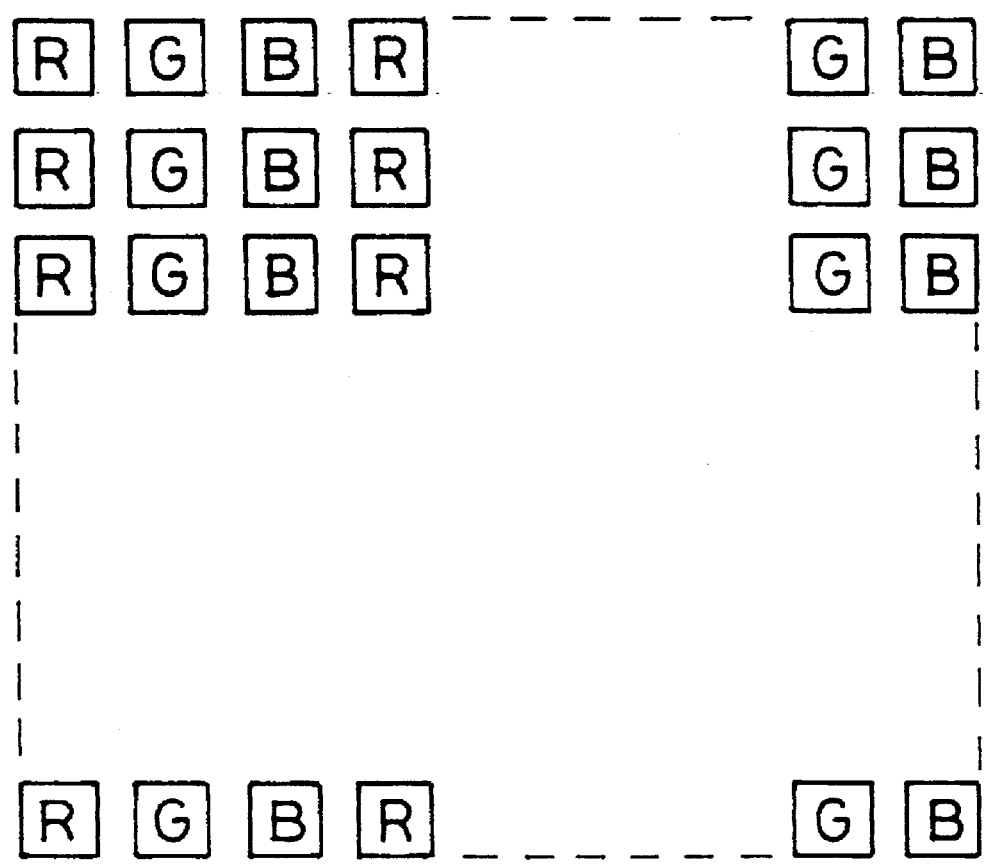
FIG. 16 schematically shows a plurality of color selection layers arranged for forming pixels corresponding to the matrix of the electrodes of FIG. 15.

In the present invention, various driving modes can be employed, for example a single matrix driving mode. In this case, a scanning circuit and a driver circuit are connected to the liquid crystal layer of the optical layer. Bias is applied from a power supply circuit to drive the liquid crystal layer by a voltage equalizing method. Referring to FIG. 14, a plurality of electrodes 51 crossing each other with a liquid crystal layer therebetween includes a scanning electrode group 55 and a data electrode group 56. The arranged electrodes form a matrix as shown in FIG. 15, for example. The color selection layers are arranged as shown in FIG. 16 according to this matrix. In this figure, R, G, and B imply the selected red, green, and blue, respectively. A liquid crystal layer is a super twist type, for example, in which liquid crystal molecules are twisted 180°–260°. A scanning circuit 52 is connected to scanning electrode group 55, and a driver circuit 53 is connected to data electrode group 56. Scanning circuit 52 and driver circuit 53 are connected to a power supply circuit 60. A clock signal, a timing signal, or a data signal is applied to these circuits to drive the liquid crystal layer according to a voltage equalizing method. More specifically, scanning circuit 52 sequentially selects each row of the scanning electrode group to provide a select voltage. Driver circuit 53 receives a picture signal by each column to provide a select voltage or a non-select voltage to data electrode group 56. When the liquid crystal layer functions as a shutter in the optical layer, color display can be carried out according to the response rate of the liquid crystal layer. When the liquid crystal layer controls the vibration direction of light, a high speed drive corresponding to the change of the polarization mode can be carried out. For example, when the duty is $\frac{1}{200}$, and bias is $\frac{1}{15}$, a dot matrix display of 200×560 can carry out graphic display of high color purity and bright display.

Recently, a new driving method that scans all rows simultaneously is proposed to solve problems such as the delay in display response, reduction of contrast, and generation of a ghost when the time sharing number is increased in the linear sequential system which is a conventional strictly simple matrix drive. Such a driving method is disclosed in, for example, *Nikkei Microdevice*, August 1992. This driving method provides the optimum on/off ratio of voltage for realizing high contrast using a normal orthogonal matrix. This usage of a normal orthogonal function allows a low amount of a voltage dispersed over time to be applied for each pixel under the balance of applied voltage of the entire screen, so that a predetermined effective value voltage is applied to result in voltage equalizing method.

Figure 18:
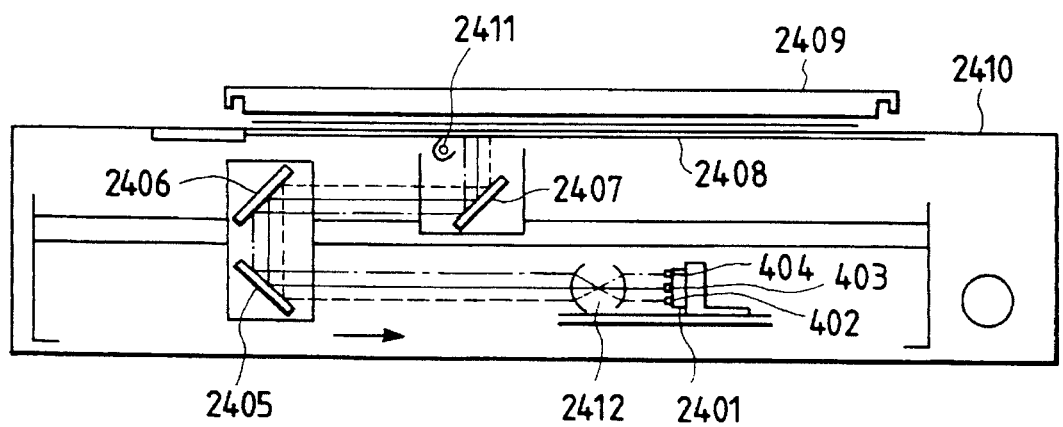
FIG. 18 is a diagram showing three functions associated with the voltage applied to the scanning electrode of a liquid crystal display.
Figure 17:
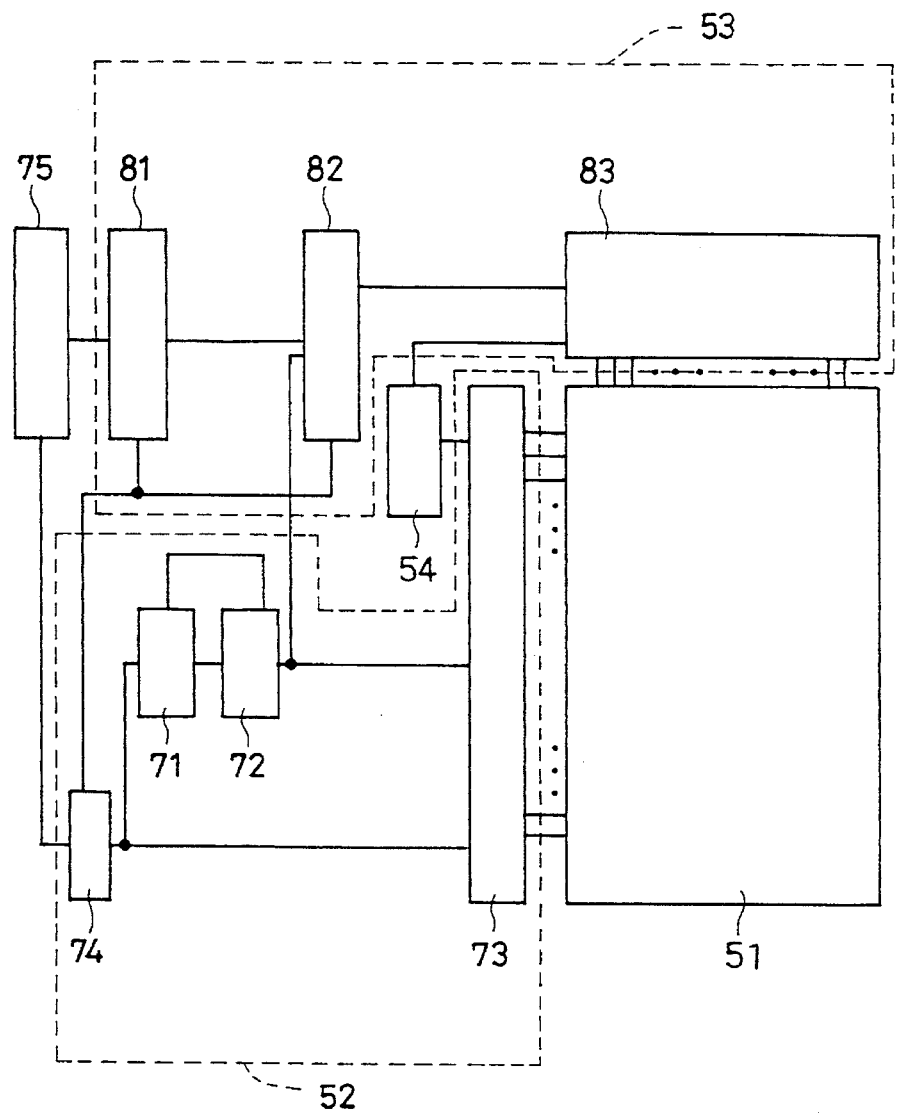
FIG. 17 shows a structure of a circuit connected to the liquid crystal display of the present invention.
Figure 18:
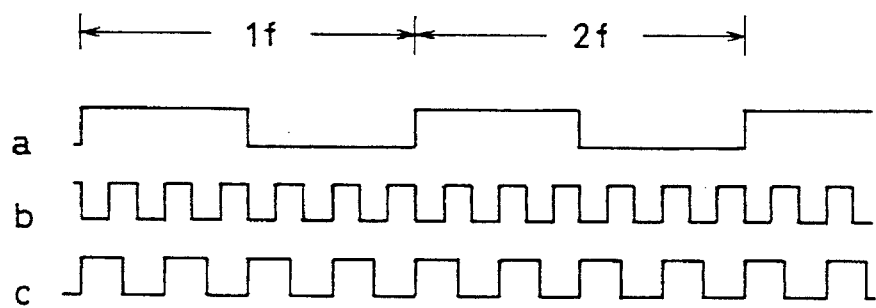

Referring to FIG. 17, the voltage is set to a value according to a predetermined function in a scanning circuit 52. When voltage is applied simultaneously to a plurality of rows of the electrode group, for example to n=3 rows in a liquid crystal display 51, the Walsh function, the Rademacher function or the Hadamard function of a normal orthogonal matrix is used. Three arbitrary row vectors of this function are derived without duplication to be used as a matrix A. For example, three functions a, b and c as shown in FIG. 18 with a period whose least common multiple is 24 are selected. The three functions are allotted with two values of +1 and −1 for the period of 24. When the value of n is lower than the number of scanning electrodes, there are electrodes not scanned in a prescribed time period, and zero potential is selected for these electrodes. Zero potential is not necessary when voltage is to be applied to all the scanning electrodes of one screen.

In scanning circuit 52 of FIG. 17, counter 71 such as a ring counter or the like for specifying the period of the function includes a 24-ary shift register. A ROM72 provides a value of the function corresponding to the period specified by counter 71. A scan driver 73 selects a voltage obtained from a bias circuit 54 according to a value determined by function ROM72 and provides a corresponding applied voltage to the three scanning electrodes selected according to a signal of timing circuit 74, and provides an applied voltage of zero potential to the scanning electrodes that are not specified. Timing circuit 74 applies the timing signal or a clock signal to the above-described counter 71 and data circuit 53. Data circuit 53 receives a picture signal of one screen from a controller 75 such as a VGA controller to determine an applied voltage according to a predetermined function and applies voltage to the other electrode group of liquid crystal display 51. In the case of the aforementioned Walsh function, a calculation circuit 82 calculates the product of an element of matrix A and an element of an information vector to be displayed to set a plurality of voltage values. Data driver 83 selects an appropriate voltage from bias circuit 54 to apply a predetermined voltage. A picture signal is stored in a buffer 81 if necessary. Picture signals by each column corresponding to the scanned 3 rows can be stored and then output in accordance with the timing. Calculation circuit 82 carries out the calculation of $(F/N^{1/2}) \cdot \Sigma(I_{ij}A_i (\Delta t_k))$ for a pixel of an arbitrary coordinates i, j. Although the applied voltage is an analog value, it may be approximated to a small set of predetermined voltage values. When a simple normal orthogonal function such as the Walsh function is to be used, approximation calculation can be carried out by subjecting to the adder after obtaining an exclusive OR. Bias circuit 54 applies a bias voltage to circuits 52 and 53. Circuit 52 is applied with V+ and V− corresponding to the two values of +1 and −1, respectively, and zero potential if necessary. Circuit 53 is applied with the above-described set of voltage values V1, V2, V3, V4, and V5, and V+, V− if necessary. The outputs of function ROM72 are provided as three signal lines of S1, S2, and S3. V+ and V− corresponding to a function value of every 3 rows of scanning electrodes are provided. Circuit 73 may be implemented by three integrated circuits or blocks so as to apply zero voltage to the other scanning electrodes. The zero potential may use V3 of bias circuit 54. The information vector is applied to data driver 83 as a 3-bit data D. One of the voltages of V1–V5 is selected according to the level thereof to be applied to the data electrode. The bias circuit is not limited to the above-described embodiment, and V1=V−, V+=V5 or a higher or lower voltage value of V1 to V5 may be set according to the functions and driving condition. The number of the voltage values can be set to an even number or an odd number according to the conditions thereof. According to the such a circuit structure, a display of a duty of 1/400 and 1024000 pixels for example, can carry out a bright graphic display having high color purity.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A multi/full color liquid display device comprising:

a plurality of color selection layers consisting essentially of a cholesteric liquid crystal for reflecting respectively circularly polarized light of red, blue and green, an optical layer formed on said color selection layers at a side where said circularly polarized light is reflected, and a layer formed on said color selection layers, at a side opposite to said optical layer, for absorbing light transmitted through said color selection layers, wherein said optical layer comprises a single liquid crystal layer consisting essentially of a ferroelectric liquid crystal of uniaxial orientation and covering entirely arranged said plurality of color selection layers, matrix electrodes holding said liquid crystal layer therebetween, a single phase shifting film covering entirely arranged said plurality of color selection layers, and a polarizer, wherein said optical layer generates at least one of circularly polarized light and elliptically polarized light approximating circularly polarized light for red, blue and green light when said liquid crystal layer is in one of an ON state and an OFF state, wherein the voltage between said matrix electrodes is different in amount between colors, whereby said optical layer has different retardation for each selection wavelength, and wherein said optical layer responds to the driving voltage between said matrix electrodes for effecting multi/full color display by light reflected by said plurality of color selection layers.

2. The multi/full color liquid display device according to claim 1, wherein said liquid crystal layer, said phase shifting film and said polarizer are provided on said color selection layers in sequence.

3. The multi/full color liquid crystal display according to claim 1, wherein said phase shifting film, said liquid crystal layer, and said polarizer are provided on said color selection layers in sequence.

4. The full/multi color liquid crystal display according to claim 1, wherein said color selection layers are formed by overlaying layers that respectively reflect light of right rotation and light of left rotation for circular polarization of red, blue and green.

5. A multi/full color liquid crystal display device, comprising:

a plurality of color selection layers consisting essentially of a cholesteric liquid crystal for reflecting respectively circularly polarized light of red, blue and green, an optical layer formed on said color selection layer at a side on which said circularly polarized light is reflected, and a layer formed on said color selection layer at a side opposite to said optical layer for absorbing light transmitted through said color selection layers, wherein said optical layer comprises a single liquid crystal layer consisting essentially of a chiral nematic liquid crystal that covers entirely arranged said plurality of color selection layers for generating circularly polarized light of a low order for light in visible spectrum, matrix electrodes holding said liquid crystal layer therebetween, a single phase shifting film covering entirely arranged said plurality of color selection layers, and a polarizer, wherein said optical layer generates at least one of circularly polarized light and elliptically polarized light approximating circularly polarized light for red, blue and green light when said liquid crystal layer is in one of an ON state and an OFF state, wherein the voltage between said matrix electrodes is different in amount between colors, whereby said optical layer has different retardation for each selection wavelength, and wherein said optical layer responds to a driving voltage between said matrix electrodes for effecting multi/full color display by light reflected by said plurality of color selection layers.

6. The multi/full color liquid crystal display according to claim 5, wherein said liquid crystal layer, said phase shifting film, and said polarizer are provided on said color selection layers in sequence.

7. The multi/full color liquid crystal display according to claim 5, wherein said phase shifting film, said liquid crystal layer, and said polarizer are provided on said color selection layer in sequence.

8. The multi/full color liquid crystal display according to claim 5, wherein said color selection layers are formed by overlaying layers respectively reflecting light in right rotation and light in left rotation for circular polarization of red, blue and green.

* * * * *